March 13, 1962  W. R. POWERS  3,025,200
CELLIFORM STRUCTURE AND METHOD OF MAKING SAME
Filed Aug. 9, 1957  2 Sheets-Sheet 1

INVENTOR:
WILLIAM R. POWERS
BY Howson & Howson
ATTYS.

March 13, 1962 W. R. POWERS 3,025,200
CELLIFORM STRUCTURE AND METHOD OF MAKING SAME
Filed Aug. 9, 1957 2 Sheets-Sheet 2

INVENTOR:
WILLIAM R. POWERS
BY Howson & Howson
ATTYS.

United States Patent Office 3,025,200
Patented Mar. 13, 1962

3,025,200
CELLIFORM STRUCTURE AND METHOD OF MAKING SAME
William R. Powers, Pennsgrove, N.J., assignor to Scott Paper Company, Philadelphia, Pa., a corporation of Pennsylvania
Filed Aug. 9, 1957, Ser. No. 677,376
11 Claims. (Cl. 154—54)

This invention relates to the preparation of flexible isocyanate-derived polymer structures of improved compression/deflection characteristics, and to the resulting products. More particularly, it relates to a method for the conversion of flexible foamed isocyanate-derived polymer celliform structures to structures which possess increased tear and tensile strength, elongation, and surface/volume ratio, and which are characterized by a more linear, uniform, and evenly distributed compression response to applied pressure and are particularly adapted for use as cushioning materials.

Isocyanate-derived polymers are polymeric materials wherein residues of polyisocyanate compounds form a part of the polymer chain, the polyisocyanate residues acting as chain-extending and cross-linking agents to form ultimate polymer molecules of high molecular weight. The isocyanate-derived polymers are designated in accordance with the type of polymer chain forming the major portion of the ultimate polymer molecule, which may be a polyester, a polyether, or the like; and in accordance with the nature of the bond derived from the isocyanate radical in the chain forming reaction, which may be a urethane bond, a urea bond, an amide bond, or other. Thus, an isocyanate-derived polymer may be a polymeric polyester polyurethane, a polymeric polyether polyurethane, and so forth.

By a celliform structure is herein meant a structure in which at least the outlines of a 3-dimensional cellular structure are present. The faces of the cells outlined may be present or may be lacking. Celliform structures wherein at least a major portion of the cell faces are present, in the form of sheets, membranes, or other obstructions to free passage in every direction between the cells, are herein designated cellular structures.

Foamed cellular structures comprising isocyanate-derived polymers are well known. In the production of isocyanate-derived polymer foams, terminal or unreacted isocyanate radicals in the polymer chain are caused to react to form carbon dioxide, whereupon the evolution and expansion of the carbon dioxide results in cellulation of the foamed polymer product. If the foaming process is allowed to continue until a low density structure is produced, an open-cell product may be obtained. In an open-cell structure, a portion of the cell faces are ruptured, and the cells are intercommunicating, although the cellular structure, permeable but not substantially attenuated, is retained. Open-cell isocyanate-derived polymer foamed cellular structures may be of very low density, as light as 2 pounds per cubic foot or less. Depending on the molecular structure of the polymer, the foamed cellular materials range from rigid and boardlike to soft and flexible. Flexible isocyanate-derived polymer foamed cellular structures are resilient, and recover their original shape after deformation.

By a treatment as described further hereinafter, isocyanate-derived polymer cellular structures may be converted to celliform, reticulated structures, comprising a 3-dimensional network of polymer strands defining the skeletal outline of the original cellular structure. The reticulated structures are generally softer than the corresponding cellular structures, and much more porous.

Flexible isocyanate-derived polymer foamed celliform structures, of the open-cell cellular or reticulated type, have many of the properties desirable in cushioning materials. Such structures are yielding and ductile because of their flexibility. They are shape-maintaining because of their resilience. They are light and economical by reason of the low content of solid matter per volume in low density foams. In either the open-cell cellular or the reticulated construction, they are porous and self-ventilating.

Figure 5:
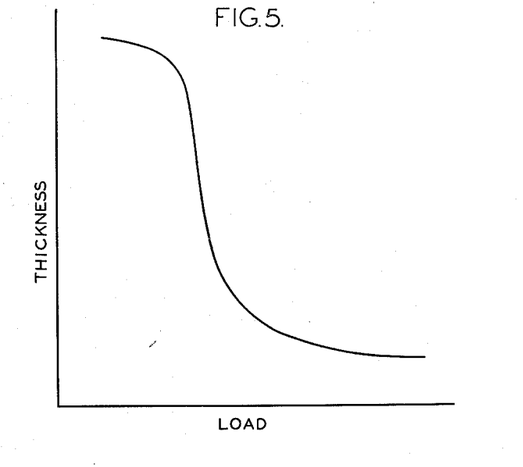
FIGURE 5 shows a typical compression/deflection curve for a foamed open-cell celliform isocyanate-derived polymer structure plotted against the resulting thickness of the foamed structure.

It has, however, been found that isocyanate-derived polymer open-cell flexible and resilient foamed celliform structures do not have the most desirable cushioning characteristics in respect to their behaviour on compression: they deform only slightly in response to the application of pressure up to a certain maximum, above which they give way abruptly and deform or crush down deeply on addition of further small increments of load. This is illustrated in FIGURE 5, showing a plot of pressure applied and the correspondingly produced thickness for a typical isocyanate-derived polymer celliform structure. Curves of the type illustrated are obtained for isotropic foamed isocyanate-derived polymer structures of either the open-cell cellular or the reticulated type. It will be seen from FIGURE 5 that at lower load values, a large increase in the load pressure produces only a small decrease in thickness, but beyond the plateau in the curve in this area, a small increase in the load pressure produces a very sensitive response in the deflection of the foam, as shown by the subsequent steep drop in the curve. In practice, this means that when weight comprehended within the initial plateau region of the curve is placed on such a celliform structure, the structure deforms only slightly, and resists the impressed load. The celliform structure appears hard and unyielding under these conditions. When a greater weight is placed on the celliform structure, such that the weight falls within the region of sensitive response to pressure load, the structure deforms unevenly, at first resisting, and then as the full weight is brought to bear on it, giving way abruptly. Response to increasing pressure is not gradual and even, but instead consists of initial recalcitrance followed by convulsive collapse, and this effect is undesirably evident when such a material is used as a cushion. Furthermore, because of the steep slope of the load-thickness curve within the area within which a substantial degree of deflection occurs, there is a marked difference in the deflection produced over a range of varied load values. For use as a cushioning material, it is desirable that the supporting mass should not vary greatly in the extent of response to either a light or a heavy load over the full range of different weights encountered in normal use. The isocyanate-derived polymer foamed celliform structures which are yielding within the normal cushioning load range respond too sensitively to small increments in load for cushioning purposes.

Attempts have been made to minimize the aforementioned difficulties and to produce isocyanate-derived polymer cellular structures satisfactory for use as cushioning material by employing special polymer compositions or by adding plasticizers. Such attempts have been only partially successful and are limited in applicability.

It is a principal object of this invention to provide a resilient isocyanate-derived polymer celliform structure of improved cushioning characteristics.

It is a further object of this invention to provide a novel method of altering the compression/deflection characteristics of flexible isocyanate-derived polymer open-cell foamed celliform structures.

Another object of this invention is to provide a flexible resilient isocyanate-derived polymer celliform structure which is evenly responsive to changes in applied pressure up to at least 50% compression.

It is an additional object to provide a method for converting a flexible resilient isocyanate-derived polymer isotropic foamed cellular structure of the open-cell type and having a non-linear compression response to applied pressure into an anisotropic resilient product of improved utility as cushioning material.

It is a specific object of this invention to provide flexible resilient isocyanate-derived polymer celliform structures which have been heat-set in a partially compressed state.

It is a further object to provide foamed open-cell cellular structures of the polymeric polyester polyurethane type which are evenly responsive in compression to changes in applied pressure and which are suitable for use as cushioning materials.

An additional object is to provide flexible isocyanate-derived polymer celliform structures of increased elongation, tensile and tear strength, and surface/volume ratio, which structures are of particular utility as sponges, filters, and the like.

Still another object is to provide a flexible isocyanate-derived polymer open-cell celliform structure having a multi-sided cell structure wherein polymer strands define edges of the cells, characterized by the absence of straight polymer strands positioned normal to at least one surface of the structure, and by the presence of curved polymer strands.

These and other objects will become apparent from a consideration of the following specification and claims.

The method of this invention comprises heating a flexible foamed isocyanate-derived polymer open-cell celliform structure in a partially compressed state and continuing the heating until the celliform structure is fixed in its compressed state.

It has been found that flexible resilient isocyanate-derived polymer foamed celliform structures which have been fixed or set by heating while they are partially compressed have an even and gradual compression response to increasing pressure loads in the direction of compression during the heat-setting and are excellent cushioning materials. They deform smoothly and uniformly as the impressed load increases, and the extent of deformation produced does not change greatly over a range of pressure load values. The self-ventilating, light weight, resilient compression-set celliform structures produced by the process of the invention and characterized by compression/deflection properties desirable in cushioning supports may be used, for example, in the manufacture of mattresses, upholstered furniture, loose cushions or pillows, and the like. Additionally, the presently provided products are of increased tear and tensile strength and of greater density, containing a larger surface area per volume, as compared to the original untreated structures, and consequently the structures produced by the heat and compression treatment of this invention are of improved utility as sponges, filters, and the like.

As a result of the treatment, the shape of the curve describing the compression/deflection properties of the polymer structures, plotted as thickness produced as against load applied in the direction of compression during heat-setting, is changed from the normal S-shaped curve shown in FIGURE 5, with a plateau followed by a steep drop in the slope of the curve, into approximately a straight line relationship.

Understanding of the invention will be facilitated by consideration of the drawings, in which:

FIGURE 6 shows compression/deflection curves in terms of pressure applied in pounds per square inch plotted against relative thickness of the foamed structure for:

A—a polymeric polyester polyurethane foamed cellular structure prepared as described in Example 1;

A'—a reticulated celliform structure prepared from this polymeric polyester polyurethane cellular structure as described in Example 2; and A"—the reticulated structure, after a compression heat-setting treatment in accordance with this invention as described in Example 3;

FIGURE 7 shows compression/deflection curves in terms of pressure applied in pounds per square inch plotted against relative thickness of the foamed structure for:

A—B—the polymeric polyester polyurethane foamed cellular structure of Example 1;

B'—a reticulated structure prepared from this cellular structure as described in Example 4; and B"—the heat-set reticulated structure of Example 4;

FIGURE 8 shows compression/deflection curves in terms of pressure applied in pounds per square inch plotted against relative thickness of the foamed structure for:

C—a polymeric polyether polyurethane foamed cellular structure prepared as described in Example 5;

C'—the aforesaid polyether foam, after a skeletonizing treatment as described in Example 6; and C"—the skeletonized reticulated polyether foam after heat-setting as described in Example 7;

FIGURE 9 shows compression/deflection curves in terms of pressure applied in pounds per square inch plotted against relative thickness of the foamed structure for:

D—a polymeric polyester polyurethane foamed cellular structure prepared as described in Example 8; and D'—the cellular structure heat-set under a 33% compression as described in Example 9.

Figure 1:
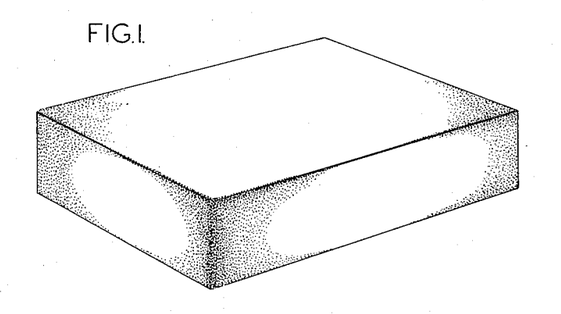
FIGURE 1 is a perspective view of a block of an isotropic open-cell celliform isocyanate-derived polymer structure which upon treatment in accordance with the invention is improved in compression/deflection properties and in other respects.
Figure 3:
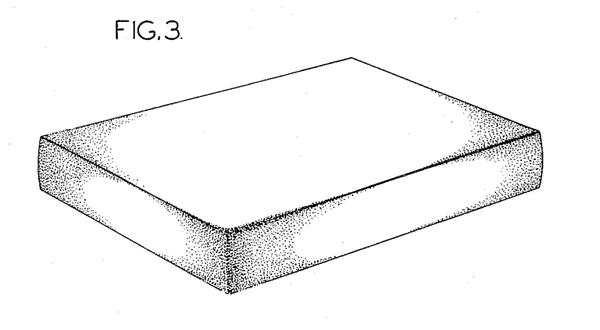
FIGURE 3 is a perspective view of the block of FIGURE 1 after heat-setting under compression in accordance with the invention.

The block of foamed open-cell celliform structure comprising isocyanate-derived polymer represented by FIGURE 1, having either an open-cell cellular or a reticulated structure, has a compression/deflection curve, plotted as load pressure against thickness, as represented by FIGURE 5. On heat-setting under compression in accordance with the present invention, there is obtained a structure of diminished dimensions as represented by FIGURE 3, with compression/deflection characteristics improved with respect to load applied in the direction in which compression was applied during heat-setting.

Figure 6:
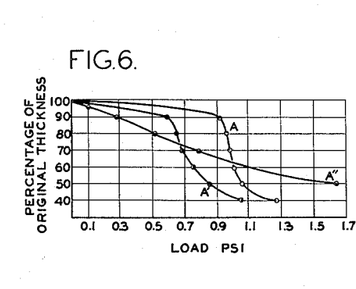

FIGURE 6 is illustrative of the change in compression/deflection characteristics produced by the process of the invention. Curve A representing the compression properties of a polymeric polyester polyurethane foamed cellular structure is a typical curve for isocyanate-derived polymer celliform structures, and resembles that shown in FIGURE 5, with a plateau followed by a steeply sloping decline. An hydrolytic treatment of the foamed structure produces the reticulated material having the compression characteristics represented by curve A'. Less pressure is required to compress this softer structure to a given degree, and the curve is displaced toward the ordinate, but is substantially the same shape as before. After heat-setting, the porous structure of curve A" has a smooth uniform relationship between pressure applied and resulting compression, which is almost a straight line. As a consequence of this straight-line relationship, the heat-set structure has improved cushioning qualities.

Low density foamed polymeric cellular structures, are produced by expansion of bubbles of gas or vapor within a mass of polymer in the plastic state. As the bubbles expand, they contact one another and are deformed from a spherical shape into a polyhedral configuration. Optimum packing for identical spheres in such that each sphere is surrounded by 12 others; accordingly, it has been found that cellular structures foamed to low density comprise strands and membranes of polymer defining the edges and faces of cells of a generally dodecahedral shape, with pentagonal sides. Within any foamed structure, cells will be found of varying shapes, but this is the general rule. When the cells have expanded to the point of contact and formed polyhedral cells, the remaining gas pressure generally ruptures one or more common cell faces to produce an open-cell structure, that is, a structure in which the cells are intercommunicating. In the aforementioned reticulated celliform structures, a major portion of the cell faces have been removed, to produce a porous structure in which a network of polymer strands define the outline of the polyhedral cells. It is believed that the peculiar compression/deflection characteristics of these isocyanate-derived polymer foamed celliform structures are due to this straight-sided polyhedral cell structure in the open-cell cellular and reticulated products. Deformation is resisted, despite the flexibility of the polymer, because of the geometry of the over-all structure: when pressure is applied from any direction, it meets resistance from straight strands of polymer, forming the sides of the polyhedral cells, which are being crushed in vertical compression. It is well known that straight structural framework column members may withstand in compression loads of very much greater magnitude than can be resisted in bending stress.

In the treatment of this invention, it is believed that the compression applied buckles strands of polymer defining edges of the cells and the heat treatment sets the polymeric material in this position. When membranes over cell faces are present, these are also buckled by the compression. This minimizes resistance to pressures subsequently applied to the foam in the direction of the heat treatment compression pressure, since straight structural framework column members in a position substantially vertical to the direction of pressure, which would be susceptible of resisting applied force in compression, have been converted into bent and buckled rods, which have less resistance to compression, and may in fact act like springs, to increase the resilience of the foamed material.

The resulting celliform product is characterized by the absence of straight polymer strands positioned normal to the surface of the structure against which compression has been applied during the heat-setting. Instead of the normal geometry of a foamed open-cell cellular mass, with a straight-sided polyhedral cell structure, in the compression-set celliform structure, polymer strands defining the cell outlines are, at least in part, curved, rather than straight.

Referring further to the drawings, FIGURE 1 represents a block of an open-cell isocyanate-derived polymer celliform structure.

Figure 2:
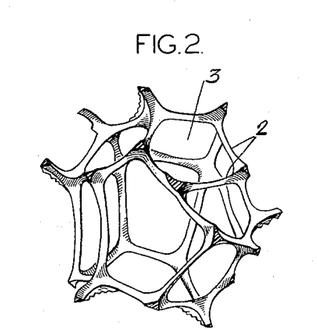
FIGURE 2 is an enlarged perspective view of a typical cell of the block of FIGURE 1 in the embodiment of this invention wherein the celliform structure is reticulated.

FIGURE 2 is an enlarged perspective view of a typical cell of a foamed celliform structure represented by FIGURE 1, in the embodiment of this invention comprising a reticulated celliform structure, in which strands 2 define the outline of the cell faces. In the embodiment of this invention wherein the celliform structure is an open-cell cellular structure, a majority, though not all, of the faces 3 defined by the strands 2 are covered by a membrane-like cell face comprising a thin sheet of polymer, and the cells are otherwise of the same general configuration as shown by FIGURE 2. The strands 2 of the celliform structure are essentially straight framework members, and in a mass of cells forming a celliform structure, pressure applied to a surface of the structure meets resistance from strands positioned parallel to the direction of pressure.

FIGURE 3 represents a block of foamed isocyanate-derived polymer open-cell celliform structure after heat-setting under compression in accordance with the invention. The block is diminished in thickness in the direction in which compression has been applied during the heat-setting treatment, and is of improved compression/deflection characteristics in the direction in which compression was applied during the heat-setting.

Figure 4:
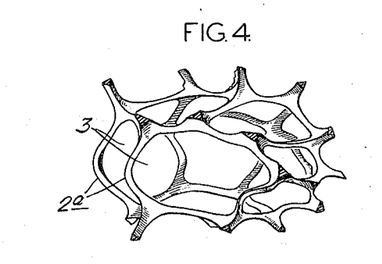
FIGURE 4 is an enlarged perspective view of a typical cell, of a reticulated celliform structure, of the block of FIGURE 3.

FIGURE 4 is an enlarged perspective view of a typical cell of the block of FIGURE 3, heat-set under compression, in the embodiment of this invention which relates to a reticulated structure. Pressure has been applied from above in the compression, and the cell is flattened down. Strands 2a originally parallel to the direction of compression are curved and bent, so that there are no straight strands positioned in a direction parallel to the direction of compression and hence normal to the surface against which compression has been applied. The distortion and alteration of the cell geometry occur similarly in the embodiment of the invention wherein membranes extend over faces 3 of cells in a celliform structure of the open-cell cellular type.

As illustrated in FIGURE 2, the typical cell of the open-cell celliform structure of a foamed isocyanate-derived polymer is an essentially regular polyhedron, in which the distance from side to side is substantially the same as from top to bottom. A foamed cellular structure comprising cells of this nature will be isotropic or non-directional in properties. Compression/deflection characteristics of a cube of isotropic material are the same, whichever face of the cube is exposed to the compressing load. Foamed isocyanate-derived polymer open-cell cellular structures are generally substantially isotropic, but may under some circumstances vary from this condition. Thus, ordinarily polymeric materials are foamed in the plastic state within a container which imposes limits on expansion in one or more directions; for example, in an open-topped container, the foaming material may be free to expand upwards, but not to the sides. Under these conditions, the cells formed, particularly towards the top of the container, where there is little or no superimposed weight, may be elongated vertically, as compared to their horizontal dimensions. A cellular structure comprising cells elongated in one dimension will be anisotropic. Compression/deflection characteristics of a cube of such material will vary, depending on the direction of application of pressure. In other respects, however, the geometry of the structure will be as described above, with straight structural framework column members, resisting compression and affecting the nature of the compression/deflection curves in every direction.

On compression-setting in accordance with this invention, an isotropic open-cell celliform structure comprising isocyanate-derived polymers is converted to an anisotropic structure. This change is evident from comparison of FIGURES 2 and 4. In FIGURE 2, the cell represented, which is typical of an isotropic cellular structure, could be effectively circumscribed by a sphere. The cell of FIGURE 4, representative of a structure heat-set under compression, would be most closely circumscribed by an ovoid. The cell is flattened and elongated. A cellular structure comprising cells of this nature would be anisotropic. The conversion of an isotropic to an anisotropic structure is typical of the present process, and will represent one preferred embodiment of this invention. It will be realized, however, that the present process may also be applied to initially anisotropic structures to bend polymer strands, alter the geometry of the cell structure, and improve the compression/deflection characteristics thereof.

One class of polymeric structures which may be converted to improved cushioning materials by the process of the invention comprises the flexible resilient isocyanate-derived polymer foamed cellular structures of the open-cell type. The production of foamed open-cell cellular structures comprising isocyanate-derived polymers is well understood in the art. As noted above, the isocyanate-derived polymers comprise polymeric molecules linked by polyisocyanate residues, and are characterized by the nature of the bond to which the isocyanate radical is converted in the ultimate polymer chain, and by the nature of the polymer forming the major portion of the ultimate polymer chain. The initial polymeric molecule with which the polyisocyanate is reacted may be designated a secondary polymer.

One class of secondary polymers from which foamed isocyanate-derived polymer cellular structures may be produced comprises polyesters. The secondary polymer in this case is an alkyd resin or polymeric polyester prepared by reaction of a polyfunctional acid with a polyfunctional alcohol, such as adipic acid and ethylene glycol under such conditions there will be contained therein terminal groups having replaceable H atoms. Various modifications may be made in the polyester; for example, as a substitute for a portion of the polyfunctional alcohol, which is usually a dihydric alcohol such as glycol or a dihydric ether alcohol, there may be used a trifunctional alcohol such as glycerine. Usually excessive amounts of trifunctional and higher alcohols are avoided to obviate the possibility of excessive cross-linking within and gelling of the polyester. The polyfunctional acid employed is generally a straight chain aliphatic acid such as adipic acid, but may include an aromatic acid such as phthalic acid or an olefinic acid such as maleic acid. If the polyester contains an unsaturated acid, side chains can be introduced by addition polymerization to produce, for example, styrene-modified polyesters. Another variation in polyesters is produced by adding to the charge during the synthesis an oil, that is a triglyceride, which can enter into the polyester chain by transesterification. Advantageously, the oil may contain free hydroxyl groups, as exemplified by castor oil. It has recently been reported that polyesters can be prepared from lactones, in which reaction a single starting material acts in itself as both acid and alcohol in producing a polymeric polyester chain. Further variations and modifications in the synthesis of polyesters from which isocyanate-derived polymers may be prepared are well known in the art.

If, in the synthesis of the polyester, the polyfunctional acid is present somewhat in excess, on a molar basis, as compared to the polyfunctional alcohol, the resulting polyester contains terminal free acid groups. Reaction of isocyanate radicals with such carboxylic acid groups results in formation of amide bonds, with generation of foam-forming carbon dioxide as a by-product; by virtue of their polyfunctionality, the polyisocyanate residues function as bridges between the molecules of the polyester chains, and in the presence of suitable chain extending reagents, such as water, glycols and the like will even produce cross-linked, high molecular weight foamed polymeric structures.

Alcohol-terminated polyesters are also convertible to isocyanate-derived polymers, and hydroxyl-substituted polymers or polyols, such as polyesters containing free hydroxyl radicals, are the secondary polymers used to prepare an important class of isocyanate-derived polymers, the polyurethanes. The reaction by which isocyanate-derived polymers of the polyurethane type are prepared, involving the union of a hydroxy group with an isocyanate radical to form a urethane bond, is not productive of byproduct carbon dioxide, in contrast to the amide-forming condensation reaction described above. For foam production, an isocyanate-derived polymer of the polyurethane type may be treated, during or subsequent to reaction of the polyisocyanate with the secondary polymer or polyol, with a chain extending reagent, usually water, with which isocyanate radicals react to form carbon dioxide.

The polyol with which the polyisocyanate is reacted may be a polyester, in which case the polymer obtained may be designated a polymeric polyester polyurethane. Open-cell foamed cellular structures of polymeric polyester polyurethane form one particularly preferred starting material for preparation of structures of improved compression/deflection characteristics in accordance with this invention. Any of a variety of polyesters may be employed in preparation of such cellular structures. It is possible to prepare isocyanate-derived polymers from monomeric polyol polyesters of relatively high molecular weight, such as castor oil, the ultimate polyurethane product being a polymeric material. Preferably, the present polyurethanes are prepared from polymeric polyesters, as described hereinabove.

Another class of polyols with which polyisocyanates may be reacted to form foamed open-cell cellular structures comprises polyethers. Illustrative of polyethers from which foamed cellular structures of polymeric polyether polyurethanes may be prepared are aliphatic alkylene glycol polymers, as exemplified by poly-1,4-butylene ether glycol. Additionally, polyether molecules may include the residues of a variety of compounds, such as amines and the like, which are reactive with alkylene oxides, from which latter compounds polyethers are prepared. Such modified polyethers may also be used for preparation of polyurethane cellular structures. In another variation, a polyether may be modified by reaction with an epoxy resin prior to or concurrently with the polyisocyanate reaction and production of a foamed cellular product. Procedural details and variations which may be made in selection of the nature of the polyether used, the polyisocyanate with which it is reacted, and so forth, are well known in the art.

The preferred polyisocyanates for preparation of the presently useful polymers are aromatic diisocyanates, such as toluenediisocyanates, methylenediphenyldiisocyanates, p,p'-diphenyldiisocyanate, and so forth, but as is known, other polyisocyanates such as an aliphatic isocyanate like hexamethylenediisocyanate may be employed if desired.

In further extension of the scope and variety of isocyanate-derived polymer foamed cellular structures available, polyisocyanates may be reacted with any of a number of different polymers wherein functional groups reactive with isocyanate radicals are present, including polyesteramides, alcohol-modified urea-formaldehyde resins, and the like.

The pore size of cellular structures produced in isocyanate-derived polymer synthesis may be controlled as desired, by added foam-stabilizing or coalescing agents. The flexibility of the products may be varied by judicious selection of secondary polymer and isocyanate with respect to chain branching, steric hindrance of rotation and similar considerations.

The preparation of foamed isocyanate-derived polymer cellular structures is well understood in the art, and is described, for example, in "German Plastics Practice," published by Debell and Richardson, 1946, chapter XXI; "Plastic Foams," pages 462–465; in "Papers Presented at the Atlantic City Meeting: Synthesis of Isocyanate Polymers," published by the Division of Paints, Plastics and Printing Ink Chemistry, American Chemical Society, 1956; and in the patent literature. To the extent that soft resilient low density open-cell foamed cellular structures can be prepared from isocyanate-derived polymers, the process of this invention, which is independent of the chemical nature of the polymer, is applicable thereto.

In one preferred embodiment of the present invention, the soft resilient open-cell isocyanate-derived polymer foamed celliform structure improved in compression characteristics by the present process is a highly porous integrally formed 3-dimensionally reticulated structure as prepared in accordance with the disclosure of copending application Serial No. 655,368, filed April 26, 1957, assigned to the same assignee as the present invention. As mentioned above, low density isocyanate-derived polymer foams have an open-cell cellular structure in which strands of polymer define the edges and membranes of polymer define the faces of polyhedral cells. In accordance with the process disclosed in the aforedescribed copending application, it has been discovered that the membranes can be removed from the faces of the cells, leaving a highly porous reticulated network of the polymer strands which may be regarded as a "skeletonized" foam. This skeletonization or removal of cell faces can be accomplished by treating isocyanate-derived polymer foamed cellular structures with hydrolyzing agents under hydrolyzing conditions. Illustrative of useful hydrolyzing agents are steam and aqueous solutions of hydrolysis catalysts, which may be alkalies such as sodium hydroxide, acids such as acetic acid, and the like. The highly porous nature of the skeletonized foams obtained by this treatment makes them particularly easy to heat evenly in the present process that is described hereinbelow.

When a low density flexible isocyanate-derived polymer foamed celliform structure of the open-cell cellular or reticulated type is heat-set under compression by the present process, the resulting structure has improved compression/deflection characteristics in the direction in which it is partly compressed while being heat-set. Normally, for most applications of cushioning materials, such as mattresses, it is necessary for the celliform structure to be compressed in only one direction; however, if desired, it may be partly compressed in more than one direction.

For substantial improvement in the properties of the celliform structure, it should be compressed, in the dimensions it retains after its treatment, by between about 10 and about 50% of the original thickness, where by percent compressed is meant 100 x (1-thickness/original thickness). Preferably the structure is compressed by about 20–40%. In order to obtain uniform strain in the polymer, it is desirable first to compress the celliform structure beyond the desired ultimate compression, say about 80% compression, and thereafter allow it to relax to a lesser compression, after which it is heated to produce the fixed distortion.

The means by which the compression is produced are immaterial. Thus, for example, the isocyanate-derived polymer celliform structure may be compressed between platens of a press and heated in place, or else compressed between plates held by a tensioning device, the assembly being transferred to a heating area. In another embodiment, the polymeric structure may be subjected to high compression between nipper rolls, and then allowed to expand into a confined area in which heat is applied, while the structure is continuously moved forward. The shape of the compressing plates may be flat or curved.

The heat applied to the compressed celliform structure should be such as to produce a structure of permanently compressed dimensions. This temperature may range up to just below the softening point of the polymer; temperatures at or above the softening point must be avoided to obviate melting and loss of the celliform structure. The exact temperatures useful will vary with the nature of the polymer; in general, lower temperatures require longer times, and temperatures above 100°, and preferably from about 150° to 200° C. are desirable. For optimum results, it is desirable to heat the cellular mass as uniformly as possible; with very porous materials such as the aforementioned skeletonized foam, heating may be conveniently accomplished with hot air, while with conventional isocyanate-derived polymer foamed cellular open-cell structures, which are less porous, it is preferable to heat with high frequency electricity (dielectric heating) to ensure uniformity.

Once the material has been set or fixed in its distorted condition by the heat, the distorting load or compression force may be removed without waiting for the mass to cool; or, if desired, the structure may be cooled under compression. Preferably, the heating is continued until the celliform structure is set in the dimensions to which it is compressed while the heat is applied. However, it is also possible to heat the polymer to the extent that partial recovery takes place after the compressing force is removed, but recovery of the original dimensions is incomplete. The point at which the distortion becomes fixed can be detected by measurement of the force with which the foam presses back against the compressing force. The time required to arrive at a set stage will, of course, vary, depending on factors like the temperature used, pore size, polymer type and the like.

Conveniently, the isocyanate-derived polymer celliform structure will be treated in the form of blocks so that pressure can be applied uniformly. If desired, large blocks may be heat-set under compression under conditions conducive to uniformity, and sliced to produce slabs of the desired thickness. Naturally, if the polymer structure is of an irregular contour, some parts will, with a flat compression plate, be compressed more than others, and in this situation a foam may be produced with some parts more uniformly responsive to pressure than others. Conversely, curved platens may be applied to flat blocks of the polymeric material to the same effect of variable response.

Other variations and modifications will be evident to those skilled in the art.

The invention is illustrated but not limited by the following examples.

*Example 1*

This example describes preparation of a polyester polyurethane foamed cellular structure.

The following materials are blended together at room temperature: 0.4 part, by weight, of diethylethanolamine, 1.1 parts, by weight, of water, 0.04 part, by weight, of a polyoxyethylated vegetable oil dispersing agent ("Emulphor EL–719," sold by General Aniline and Film Corp., New York City, N.Y.), and 40 parts, by weight, of a polyester resin (alkyd) ("Paraplex U–148," sold by Rohm and Haas Company, Philadelphia, Pa.), having the following properties:

| | |
|---|---|
| Number average molecular weight | 1800–2000. |
| Equivalent weight | 745–830. |
| Hydroxyl number | 65–75. |
| Water content | 0.25% maximum. |
| Acid number | 3 maximum. |
| Average hydroxyls per molecule | 2.42. |

To the above mixture are then added 15 parts, by weight, of an approximately 80:20 isomeric mixture of toluene-2,4-diisocyanate and toluene-2,6-diisocyanate ("Hylene TM" sold by E. I. du Pont de Nemours & Co., Inc., Wilmington, Delaware).

The resulting combination is mixed thoroughly with rapid agitation for 20 seconds, and immediately poured into a container of sufficient volume to permit expansion, the temperature rising to about 85° C. After about 15 minutes, the container including the foamed mass is placed in an oven and maintained at 70° C. for 16 hours. The foam is then removed from the container and cut into blocks. The product is an open-cell cellular structure, with an average pore (cell face) diameter of 1.0 to about 1.5 mm., and a density of 0.042 gram per cubic centimeter.

*Example 2*

This example describes preparation of a polymeric polyester polyurethane reticulated structure.

A block, 12 x 7.5 x 2.5 centimeters, of flexible open-cell polymeric polyester polyurethane foamed cellular structure prepared as described in Example 1, having a density of 0.042 gram/cc., is immersed in the following bath at 80° C.

| | Parts by weight |
|---|---|
| Sodium hydroxide | 100 |
| Water | 900 |

The block is repeatedly kneaded in the bath to ensure thorough penetration of the solution for a period of one minute. It is then removed from the bath, washed thoroughly with cold water, and immersed in 2% aqueous acetic acid solution, wherein it is repeatedly kneaded to neutralize any remaining sodium hydroxide. The block is then washed with water, after which is is dried in a 100° C. forced air oven for 3 hours.

The caustic-treated foamed material exhibits a characteristic porous skeletal reticulated structure. It has a density of 0.038 gram/cc.

*Example 3*

This example describes preparation of a heat-set structure in accordance with this invention from a reticulated polymeric polyester polyurethane structure.

A portion of the block of reticulated structure prepared as described in Example 2 is placed between platens and compressed to 20% of its original thickness. The platens are then separated to a distance equal to 67% of the original thickness of the reticulated structure and the partially compressed material, still between platens, is held in a 160° C. forced air oven for 2 hours. The heat-set structure is then removed from the platens and allowed to cool to room temperature. Its thickness is 67% of the original thickness and the bulk density of the porous structure is now 0.057 gram/cc. The product is stronger and tougher than the original reticulated structure.

The foamed cellular structure of Example 1, the caustic-treated skeletal reticulated structure prepared therefrom as described in Example 2, and the heat-set product prepared as described immediately above, were then tested to determine the load in lbs./square inch required to compress the materials by the indicated amount, with the load applied in the direction in which compression had been applied to the latter material during heat-setting. Results were as follows:

| | Original Cellular Structure | Reticulated Structure | After Heat Setting |
|---|---|---|---|
| p.s.i. to decrease thickness 10% | 0.92 | 0.59 | 0.28 |
| p.s.i. to decrease thickness 20% | 0.96 | 0.64 | 0.51 |
| p.s.i. to decrease thickness 30% | 0.98 | 0.68 | 0.78 |
| p.s.i. to decrease thickness 40% | 1.01 | 0.75 | 1.09 |
| p.s.i. to decrease thickness 50% | 1.06 | 0.85 | 1.64 |
| p.s.i. to decrease thickness 60% | 1.27 | 1.04 | |

The above data are represented graphically in FIGURE 6, wherein the load, in pounds per square inch, is plotted against thickness of the material. Curve A represents the polymeric polyester polyurethane cellular structure of Example 1 and curve A', the reticulated structure prepared as described in Example 2. It will be observed that the latter curve is displaced, as compared to that of the original cellular product, but has a similar sinuous shape. By contrast, curve A", representing the heat-set product prepared as described above, has a shape closely approximating a straight line, with a uniformly increasing deflection proportionate to the load applied.

*Example 4*

This example describes preparation of a heat-set structure from another polymeric polyester polyurethane reticulated structure.

A block of a foamed polymeric polyester polyurethane cellular structure having a density of 0.042 gram/cc. and pores about 1.0 to about 1.5 mm. in diameter, prepared as described in Example 1, is kneaded for 6 minutes in 10% aqueous sodium hydroxide at 80° C., after which it is washed, rinsed with aqueous acetic acid, washed again and dried. This treatment reduces the density of the structure to 0.028 gram/cc. and yields a very fine reticulated structure.

A portion of the reticulated structure prepared as described above is placed between platens, compressed to 20% of its original thickness, released to 67% of its original thickness, and then held in this partially compressed position in a 160° C. forced air oven for 2 hours. On removal from the platens and cooling to room temperature, the foamed reticulated structure has a thickness equal to 67% of the original thickness of the block and a bulk density of 0.042 gram/cc.

Determination of the compression/deflection properties of the reticulated structure, having a density of 0.028 gram/cc., and the heat-set structure prepared therefrom, compressed in the direction of compression during heat-setting, gave results as follows:

| | Reticulated Structure | Heat-Set Structure |
|---|---|---|
| p.s.i. to decrease thickness 10% | 0.21 | 0.12 |
| p.s.i. to decrease thickness 20% | 0.25 | 0.21 |
| p.s.i. to decrease thickness 30% | 0.27 | 0.29 |
| p.s.i. to decrease thickness 40% | 0.29 | 0.40 |
| p.s.i. to decrease thickness 50% | 0.33 | 0.59 |
| p.s.i. to decrease thickness 60% | 0.41 | 0.97 |

Figure 7:
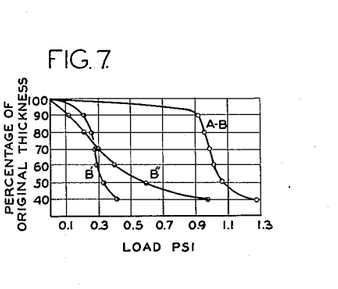

In FIGURE 7 are represented graphically the results of this treatment. Curve A—B represents the original cellular structure prepared as described in Example 1. Curve B' represents the caustic-treated reticulated structure having a density of 0.028 gram/cc.: this curve is displaced toward the ordinate as compared to the curve for the original cellular structure but has a complex shape similar to the latter. Curve B" represents the above-tabulated data for the heat-set foam prepared from the softened, reticulated structure represented by curve B'. It will be observed that curve B" nowhere changes slope abruptly, and exhibits a gradual, even and uniform deflection throughout its entire length up to 60% decrease in thickness.

*Example 5*

This example describes preparation of a polymeric polyalkylene ether polyurethane cellular structure.

*Component A.*—To a closed agitated vessel equipped with a nitrogen gas sweep are charged at 40° C., 100 parts, by weight, of a molten polyalkylene ether having a hydroxyl number of 37.6; water content of 0.04%; and melting point about 35° C.; identified as "Teracol 30," which is believed to be a poly-1,4-butylene ether glycol (sold by E. I. du Pont de Nemours & Company, Inc., Wilmington, Delaware). Next, 12.6 parts, by weight, of the toluene-2,4- and 2,6-diisocyanate mixture employed in Example 1, at a temperature of 35° C., are added and agitation is commenced. There is a mildly exothermic reaction, the temperature rising to 45–50° C. Heat is then applied and the mixture is maintained at 60° C. for 2½ hours. Then an additional 12.6 parts of the diisocyanate are added and the temperature is raised and maintained at 140° C. for 2½ hours. The charge is then cooled to 50° C. and a further 3.7 parts, by weight, of the diisocyanate are added and mixed in. Finally, the product is allowed to cool to room temperature, 25° C.

*Component B.*—A blend, at 30° C., is prepared of 51 parts, by weight, of dioctyl sebacate, a plasticizer-softener; 10 parts, by weight, of N-methylmorpholine and 2.5 parts, by weight, of triethylamine, catalysts; 5.0 parts, by weight, of a conventional silicone foam stabilizer [Dow Corning DC–200 (50 cstks.)], and 22.5 parts, by weight, of water.

To component B are added 1000 parts, by weight, of component A, and the mixture is stirred rapidly for about 20 seconds. Immediately thereafter the mass is poured into a container of sufficient volume to permit expansion;

after about 30 minutes the container together with the foamed mass is placed in an oven and maintained at 70° C. for 16 hours. The product, in the form of an open-celled cellular structure, is removed from the container and cut into blocks. Density of the blocks is about 0.036 gram/cc.; pore size is about 0.5 mm. diameter.

*Example 6*

This example describes preparation of a skeletal polymeric polyether polyurethane celliform product.

A block of the cellular polymeric polyether-polyurethane foam of Example 5 is immersed and kneaded in a bath composed of:

| | Parts by weight |
|---|---|
| Sodium hydroxide | 200 |
| Water | 800 | at the boil temperature of the bath for a period of 10 minutes. The block is then removed, washed well with cold water, and rinsed with 2% acetic acid to neutralize any residual sodium hydroxide. Finally it is washed in water and dried at 100° C. for 3 hours.

Visual examination of the product indicates that the membranes covering the cell faces have been removed, leaving behind a characteristic porous skeletal structure. Loss of weight is very small, less than 2%.

*Example 7*

The porous structure as described in Example 6 is heat-set as described above by compressing to 20% of the original thickness, relaxing to 67% of the original thickness and heat-setting at 160° C. in a forced air oven for 2 hours. On removal from the oven, the porous structure retains the thickness equal to 67% of its original thickness and has a density of 0.051 gram/cc.

The cellular structure prepared as described in Example 5, the reticulated structure prepared therefrom as described in Example 6, and the heat-set structure prepared as described in this example, were tested to determine their compression/deflection properties. Results were as follows:

| | Original | After NaOH Treatment | After Heat-Setting |
|---|---|---|---|
| p.s.i. to decrease thickness 10% | 0.36 | 0.18 | 0.11 |
| p.s.i. to decrease thickness 20% | 0.47 | 0.25 | 0.21 |
| p.s.i. to decrease thickness 30% | 0.51 | 0.30 | 0.30 |
| p.s.i. to decrease thickness 40% | 0.56 | 0.34 | 0.40 |
| p.s.i. to decrease thickness 50% | 0.61 | 0.40 | 0.56 |
| p.s.i. to decrease thickness 60% | 0.71 | 0.52 | 0.90 |
| p.s.i. to decrease thickness 70% | 1.03 | 0.89 | 1.70 |

Figure 8:
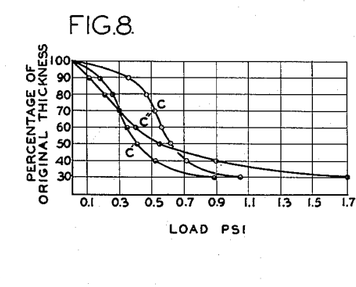

The results obtained are shown in graphical form in FIGURE 8, wherein curve C represents the cellular structure prepared as described in Example 5, and curve C' represents the caustic-treated structure prepared as described in Example 6. It will be observed that curve C' resembles curve C in shape but is displaced towards the direction of greater softness and greater compression at lower loads. Curve C'' represents the heat-set foam prepared as described hereinabove from the caustic-treated foam of Example 6; the relationship between thickness and load applied to this heat-set foam in the direction of compression during heat-setting, up to 50% deflection, is approximately a straight line, with a gradual and evenly distributed compression response to increments in applied pressure throughout its length.

*Example 8*

This example describes preparation of a polymeric polyester polyurethane cellular structure.

*Component A.*—Into a closed container equipped with an agitator and means for maintaining a nitrogen gas sweep are charged, at room temperature, 50 parts, by weight, of the isomeric mixture of toluene-2,4-diisocyanate and toluene-2,6-diisocyanate employed in Example 1, and 50 parts, by weight, of the polyester resin (alkyd) used in Example 1.

The above-described mixture is agitated under a maintained nitrogen atmosphere for four hours, the temperature rising to approximately 32° C.

*Component B.*—There are blended at room temperature: 80 parts, by weight, of the polyester resin referred to above, 0.6 part, by weight, of the polyoxyethylated vegetable oil employed in Example 1, 4.5 parts, by weight, of water, and 1.9 parts, by weight, of diethylethanolamine.

100 parts, by weight, of component A are added to 87 parts, by weight, of component B, and thoroughly mixed for about 20 seconds at a starting temperature of about 25° C. The mixture is then immediately poured into a container of sufficient volume to permit expansion. After about 15 minutes the product sets to a cellular mass, the temperature rising to about 75° C. The container together with the foamed mass is placed in an oven and held at 70° C. for approximately 16 hours. The product, in the form of an open-cell, foamed mass, is removed from the container and cut into blocks.

The blocks have a density of 0.048 gram/cc. The portion of closed cells of the product is very small and the cell faces have an approximate diameter of 0.5 mm.

*Example 9*

Blocks, 12.5 x 7.5 x 2.5 centimeters, prepared as described in Example 8, were compressed between platens to about 20% of their original thickness, and then relieved varying amounts. The blocks of the polyester polyurethane cellular structure, still partially compressed between the platens, were heat-set for 2 hours in a 160° C. forced air oven and then removed from the oven, allowed to cool, and taken out from between the platens. Compression/deflection characteristics of the series, with load applied in the same direction as compression during heat-setting, were as follows:

| Percent compression while heat-setting | 0 | 9 | 17 | 23 | 28 | 33 |
|---|---|---|---|---|---|---|
| Final Bulk Density—g./cc. | .048 | .053 | .058 | .062 | .067 | .071 |
| p.s.i. to compress 10% | 0.90 | 0.65 | 0.58 | 0.56 | 0.54 | 0.55 |
| p.s.i. to compress 20% | 1.00 | 0.84 | 0.83 | 0.85 | 0.88 | 0.92 |
| p.s.i. to compress 30% | 1.10 | 0.98 | 0.99 | 1.05 | 1.12 | 1.20 |
| p.s.i. to compress 40% | 1.24 | 1.15 | 1.16 | 1.28 | 1.36 | 1.51 |
| p.s.i. to compress 50% | 1.49 | 1.41 | 1.41 | 1.66 | 1.76 | 2.0 |
| p.s.i. to compress 60% | 1.98 | 2.0 | 1.90 | | | |

Figure 9:
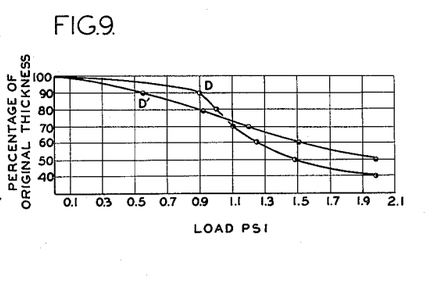

The data given above for the initial cellular structure and for the structure heat-set at 33% compression are represented graphically in FIGURE 9, wherein the change from an irregular sinuous curve to a straight-line relationship is evident. The cellular structures set at lesser compression give curves intermediate in slope; the changes in the compression/deflection properties produced are evident from inspection of the above data.

It will be evident from the foregoing that the process of this invention may be applied to a variety of flexible isocyanate-derived polymer structures to alter and improve the properties thereof. The celliform structures treated may vary from open-cell cellular materials containing cells substantially completely defined by cell walls comprising polymer membranes, to reticulated networks comprising only the outlines of a cellular structure, and may vary in pore size, pliability, and other respects. Wide variation is contemplated in the nature of the isocyanate-derived polymer forming the celliform structure. The heat-setting treatment may be applied so as to produce fixed celliform structures compressed to varying degrees, depending on whether the intended application of the product primarily requires strength and maximum surface area, or is directed chiefly to cushioning qualities.

While the invention has been described with particular reference to various preferred embodiments thereof, it will be appreciated that modifications and variations can

What is claimed is:

1. The method of improving at least the compression/deflection characteristics and cushioning qualities of a foamed isocyanate-derived polymer open-cell celliform structure which comprises heating at a temperature of from about 100° C. up to a temperature immediately below its softening point a flexible isocyanate-derived polymer open-cell celliform structure having a non-linear compression response to applied pressure, while said structure is compressed in at least one dimension, by from about 10 to about 50 percent, and continuing said heating until said structure is fixed in its compressed state.

2. The method of claim 1, wherein said structure is initially compressed to a greater extent than the ultimate dimensions of the structure after heat-setting, and subsequently relaxed to a partial compression of from 20 to 40 percent, after which it is heated until a structure of fixed compressed dimensions is obtained.

3. The method of improving at least the compression/deflection characteristics and cushioning qualities of a foamed isocyanate-derived polymer open-cell celliform structure which comprises heating at a temperature of from about 100° C. up to a temperature immediately below its softening point a flexible and resilient polymeric polyester polyurethane open-cell celliform structure having a non-linear compression response to applied pressure, while said structure is compressed in at least one dimension by from about 10 to about 50 percent, and continuing said heating until a structure fixedly compressed in at least one dimension is obtained.

4. The method of improving at least the compression/deflection characteristics and cushioning qualities of a foamed isocyanate-derived polymer open-cell celliform structure which comprises heating at a temperature of from about 100° C. up to a temperature immediately below its softening point a flexible and resilient polymeric polyether polyurethane structure having a non-linear compression response to applied pressure, while said structure is compressed in at least one dimension by from about 10 to about 50 percent, and continuing said heating until a structure fixedly compressed in at least one dimension is obtained.

5. The method of improving at least the compression/deflection characteristics and cushioning qualities of a foamed isocyanate-derived polymer open-cell celliform structure which comprises heating at a temperature of from about 100° C. up to a temperature immediately below its softening point a flexible and resilient integrally formed 3-dimensionally reticulated structure comprising isocyanate-derived polymer, said structure having a non-linear compression response to applied pressure, while said structure is compressed in at least one dimension by from about 10 to about 50 percent and continuing said heating until said structure is fixed in its compressed state.

6. The method of claim 5, wherein said isocyanate-derived polymer is a polymeric polyester polyurethane.

7. The method of claim 5, wherein said isocyanate-derived polymer is a polymeric polyether polyurethane.

8. A novel article of manufacture comprising a flexible foamed isocyanate-derived polymer open-cell celliform structure having a polyhedral cell structure, wherein polymer strands define edges of the cells, characterized by the presence of physically deformed polymer strands segments of which have been bent beyond their normal configuration and set in such abnormal state lying between at least two opposed surfaces of said structure affording thereto substantially even and uniform response in terms of deflection to incrementally increasing applied pressure up to at least about 50% compression in at least one direction.

9. A novel article of manufacture comprising a flexible foamed polymeric polyester polyurethane open-cell celliform structure, wherein polymer strands define edges of the cells, characterized by the presence of polymer strands which have been distorted from their normal configuration, said distorted strands being fixed lying between at least two opposed surfaces of said structure affording thereto substantially even and uniform response in terms of deflection to incrementally increasing applied pressure up to at least about 50% compression in at least one direction.

10. A novel article of manufacture comprising a flexible foamed polymeric polyesther polyurethane open-cell cellular structure, wherein polymer strands define edges of the cells, characterized by the presence of polymer strands segments of which have been bent beyond their normal configuration and set in such abnormal state lying between at least two opposed surfaces of said structure affording thereto substantially even and uniform response in terms of deflection to incrementally increasing applied pressure up to at least about 50% compression in at least one direction.

11. A novel article of manufacture comprising a flexible resilient integrally formed 3-dimensionally reticulated structure of isocyanate-derived polymer heat-set in a partially compressed state, wherein polymer strands lying between opposed surfaces normal to such compression are abnormally curved, affording thereto substantially even and uniform response in terms of deflection to incrementally increasing applied pressure up to at least about 50% compression in at least one direction.

References Cited in the file of this patent

UNITED STATES PATENTS

| 2,384,387 | Meyer | Sept. 4, 1945 |
| 2,795,008 | Lindermann et al. | June 11, 1957 |
| 2,878,153 | Hacklander | Mar. 17, 1959 |

FOREIGN PATENTS

| 1,136,608 | France | Dec. 29, 1956 |
| 789,481 | Great Britain | Jan. 22, 1958 |

OTHER REFERENCES

Rubber Age, August 1956, pages 803–810.

UNITED STATES PATENT OFFICE

CERTIFICATE OF CORRECTION

Patent No. 3,025,200          Dated March 13, 1962

Inventor          William R. Powers

It is certified that error appears in the above-identified patent and that said Letters Patent are hereby corrected as shown below:

In Claim 10, line 2, substitute the word "polyether" for the word "polyesther" so that Claim 10 will appear as follows:

10. A novel article of manufacture comprising a flexible foamed polymeric polyether polyurethane open-cell cellular structure, wherein polymer strands define edges of the cells, characterized by the presence of polymer strands segments of which have been bent beyond their normal configuration and set in such abnormal state lying between at least two opposed surfaces of said structure affording thereto substantially even and uniform response in terms of deflection to incrementally increasing applied pressure up to at least about 50% compression in at least one direction.

SIGNED AND SEALED

APR 28 1970

(SEAL)
Attest:

Edward M. Fletcher, Jr.
Attesting Officer

WILLIAM E. SCHUYLER, JR.
Commissioner of Patents